United States Patent
Tsubone et al.

(10) Patent No.: US 9,616,748 B2
(45) Date of Patent: Apr. 11, 2017

(54) CONSTRUCTION MACHINERY DISPLAY SYSTEM AND CONTROL METHOD FOR SAME

(71) Applicant: Komatsu Ltd., Tokyo (JP)

(72) Inventors: Dai Tsubone, Hiratsuka (JP); Takashi Kurihara, Hiratsuka (JP); Ryo Fukano, Yokohama (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 14/654,312

(22) PCT Filed: Oct. 28, 2013

(86) PCT No.: PCT/JP2013/079133
§ 371 (c)(1),
(2) Date: Jun. 19, 2015

(87) PCT Pub. No.: WO2014/103498
PCT Pub. Date: Jul. 3, 2014

(65) Prior Publication Data
US 2016/0193920 A1    Jul. 7, 2016

(30) Foreign Application Priority Data

Dec. 28, 2012 (JP) ................................. 2012-287599

(51) Int. Cl.
*B60K 35/00* (2006.01)
*E02F 9/26* (2006.01)
(Continued)

(52) U.S. Cl.
CPC ................ *B60K 35/00* (2013.01); *E02F 9/16* (2013.01); *E02F 9/261* (2013.01); *E02F 9/264* (2013.01);
(Continued)

(58) Field of Classification Search
CPC . E02F 9/16; E02F 9/264; B60K 35/00; B60K 2350/352
(Continued)

(56) References Cited

U.S. PATENT DOCUMENTS 5,721,679 A * 2/1998 Monson ................. G02B 27/01
345/7
8,918,246 B2 * 12/2014 Friend ..................... E02F 9/261
701/34.4
(Continued)

FOREIGN PATENT DOCUMENTS

JP    H01-312129 A    12/1990
JP    H06-156119 A    6/1994
(Continued)

OTHER PUBLICATIONS

International Search Report mailed Jan. 21, 2014 from corresponding International Patent Application No. PCT/JP2013/079133, 4 pages.

*Primary Examiner* — Tyler J Lee
(74) *Attorney, Agent, or Firm* — Fish & Richardson P.C.

(57) ABSTRACT

The display system includes: stroke sensors that detect position information of working equipment relative to a body; a real image display unit; a combiner; and a display controller. Based on the position information of the working equipment, the display controller controls a displayed position of work-support information along a surface of the combiner and a depthwise displayed position of the work-support information defined in a forward direction relative to a cab. A projection image of the work-support information visible to an operator is thus displayed around the working equipment.

13 Claims, 13 Drawing Sheets

(51) Int. Cl.
*G06T 11/00* (2006.01)
*G02B 27/01* (2006.01)
*E02F 9/16* (2006.01)

(52) U.S. Cl.
CPC .......... *G02B 27/0101* (2013.01); *G06T 11/00* (2013.01); *B60K 2350/352* (2013.01)

(58) Field of Classification Search
USPC ..................................................... 701/36, 50
See application file for complete search history.

(56) References Cited

U.S. PATENT DOCUMENTS

| | | | |
|---|---|---|---|
| 2002/0045986 A1* | 4/2002 | Tamaru | ................... E01C 19/00 701/482 |
| 2006/0103590 A1* | 5/2006 | Divon | ................... G02B 27/01 345/7 |
| 2006/0139759 A1 | 6/2006 | Hashimoto et al. | |
| 2008/0088922 A1 | 4/2008 | Hashimoto et al. | |
| 2009/0177337 A1* | 7/2009 | Yuet | ..................... G05D 1/0044 701/2 |
| 2009/0231698 A1 | 9/2009 | Hashimoto et al. | |
| 2010/0289899 A1* | 11/2010 | Hendron | ................... B60R 1/00 348/148 |
| 2011/0311342 A1* | 12/2011 | Montgomery | ......... G01C 21/04 414/685 |
| 2013/0006495 A1 | 1/2013 | Tajima et al. | |
| 2014/0188333 A1* | 7/2014 | Friend | ..................... E02F 9/261 701/34.4 |

FOREIGN PATENT DOCUMENTS

| | | |
|---|---|---|
| JP | 2010018141 A | 1/2010 |
| JP | 2012136985 A | 7/2012 |
| JP | 2012172431 A | 9/2012 |
| WO | WO2007049664 A1 | 5/2007 |

* cited by examiner

CONSTRUCTION MACHINERY DISPLAY SYSTEM AND CONTROL METHOD FOR SAME

CROSS-REFERENCE TO RELATED APPLICATIONS

This application claims priority to International Application No. PCT/JP2013/079133 filed on Oct. 28, 2013, which application claims priority to Japanese Application No. 2012-287599, filed on Dec. 28, 2012. The contents of the above applications are incorporated herein by reference in their entireties.

TECHNICAL FIELD

The present invention relates to a display system for a construction machine and a control method of the display system.

BACKGROUND ART

In the field of construction machines such as a hydraulic excavator, a technique of displaying various information such as the temperature of an engine cooling water on a monitor in a cab is known (see, for instance, Patent Literature 1).

Further, a technique of displaying an image showing a designed geometry of a work ground and the position of a blade edge of a bucket on a monitor in a cab is also known (see, for instance, Patent Literature 2).

CITATION LIST

Patent Literature(s)

Patent Literature 1: JP-A-2012-136985
Patent Literature 2: JP-A-2012-172431

SUMMARY OF THE INVENTION

Problem(s) to be Solved by the Invention

The monitor is provided to a lower part of a vertical frame separating a front window and a side window of the cab so as not to reduce an operator's field of forward view (see FIG. 2 of Patent Literature 1). Since the operator is looking at working equipment while operating the working equipment, the operator has to look far away from his/her viewpoint to see information on the monitor.

The operator thus necessarily considerably moves his/her eyes during operating the working equipment, so that an operating efficiency cannot be improved.

An object of the invention is to provide a display system for a construction machine and a control method of the display system, capable of reducing the movement of operator's eyes during operation to improve an operating efficiency.

Means for Solving the Problem(s)

According to a first aspect of the invention, a display system for a construction machine, the construction machine including: working equipment; and a body attached with the working equipment and including a cab, the display system includes: a working equipment position detector configured to detect position information of the working equipment relative to the body; a real image display unit configured to display work-support information as a real image; a combiner configured to reflect the real image displayed on the real image display unit into the cab so that the work-support information is displayed as a virtual image superimposed on a view in front of the cab; and a display controller configured to control the real image display unit, in which based on the position information of the working equipment, the display controller controls a displayed position of the work-support information along a surface of the combiner and a depthwise displayed position of the work-support information defined in a forward direction relative to the cab to display around the working equipment a projection image of the work-support information visible to an operator in the cab.

According to a second aspect of the invention, the display system for the construction machine according to the first aspect further includes: a position detector configured to detect three-dimensional position information of the body including a current position, an orientation and an inclination angle of the body; and a storage device configured to store target landform information of a work ground, in which the work-support information includes operation information of the working equipment generated based on: the position information of the working equipment; the three-dimensional position information of the body; and the target landform information.

According to a third aspect of the invention, the display system for the construction machine according to the first or second aspect further includes: a position detector configured to detect three-dimensional position information of the body including a current position, an orientation and an inclination angle of the body; and a storage device configured to store target landform information of a work ground, in which the display controller controls the real image display unit to display construction ground information showing a landform in progress in accordance with geometry and position of the work ground, and the construction ground information is generated based on the three-dimensional position information of the body and the target landform information.

According to a fourth aspect of the invention, the display system for the construction machine according to any one of the first to third aspects further includes: a position detector configured to detect three-dimensional position information of the body including a current position, an orientation and an inclination angle of the body; and a storage device configured to store target landform information of a work ground and locus information of the working equipment, in which the display controller controls the real image display unit to display construction ground information indicating a landform in progress in accordance with geometry and position of the work ground, and the construction ground information is generated based on the three-dimensional position information of the body, the target landform information, and work progress information based on the locus information of the working equipment.

According to a fifth aspect of the invention, in any one of the first to fourth aspects, the display system for the construction machine according to any one of the first to fourth aspects further includes a lens optical system disposed between the real image display unit and the combiner, the lens optical system including a plurality of lenses, at least part of which is movable in an optical axis direction, in which the display controller moves the at least part of the lenses of the lens optical system in the optical axis direction to control the depthwise displayed position of the work-support information.

According to a sixth aspect of the invention, in any one of the first to fourth aspects, a distance between the real image display unit and the combiner is changeable, and the display controller changes the distance between the real image display unit and the combiner to adjust the depthwise displayed position of the work-support information.

According to a seventh aspect of the invention, a control method of a display system in a construction machine, the construction machine including: working equipment; and a body attached with the working equipment and including a cab, the display system including: a real image display unit configured to display work-support information as a real image; and a combiner configured to reflect the real image displayed on the real image display unit into the cab so that the work-support information is displayed as a virtual image superimposed on a view in front of the cab, the control method includes: detecting position information of the working equipment relative to the body; and controlling, based on the position information of the working equipment, a displayed position of the work-support information along a surface of the combiner and a depthwise displayed position of the work-support information defined in a forward direction relative to the cab to display around the working equipment a projection image of the work-support information visible to an operator in the cab.

In the first aspect, the display system, which includes the real image display unit and the combiner, can display the work-support information superimposed on the view in front of the cab. The operator can thus see the working equipment and the work-support information with less movement of his/her eyes. A reduction in the movement of the operator's eyes contributes to an improved operating efficiency.

Further, based on the position information of the working equipment, the display controller controls the displayed position of the work-support information along the surface of the combiner and the depthwise displayed position of the work-support information defined in the forward direction relative to the cab. The projection image of the work-support information visible to the operator in the cab can thus be displayed around the working equipment, thereby minimizing the movement of the operator's eyes and the adjustment of the focal point of the operator's eyes. This results in a reduction in a load on the operator for seeing the working equipment and the work-support information.

In the second aspect, the operation information of the working equipment is generated based on the position information of the working equipment, the three-dimensional position information of the body and the target landform information, and displayed as the work-support information. Movement direction and movement amount of the working equipment can thus be displayed as the operation information, so that the operator can easily operate the working equipment.

In the third aspect, the construction ground information generated based on the three-dimensional position information of the body and the target landform information is displayed in accordance with the geometry and position of the work ground. The operator can thus easily operate the working equipment in accordance with the displayed construction ground information.

In the fourth aspect, the construction ground information is generated based on the three-dimensional position information of the body, the target landform information, and the work progress information based on the locus information of the working equipment, and displayed in accordance with the geometry and position of the work ground. The operator can thus easily operate the working equipment in accordance with the displayed construction ground information. Further, the operator can see the landform in progress, so that it can be easily checked whether or not the work properly progresses as indicated by the target landform information.

In the fifth aspect, the lens optical system is disposed between the real image display unit and the combiner. The lens optical system includes the plurality of lenses, at least part of which is movable in the optical axis direction. The display controller moves the at least part of the lenses of the lens optical system in the optical axis direction. The depthwise displayed position of the work-support information is thus easily and promptly controllable.

In the sixth aspect, the display controller changes the distance between the real image display unit and the combiner to control the depthwise displayed position of the work-support information. With this arrangement, the lens optical system with lenses including a movable lens(es) can be omitted.

The seventh aspect provides effects similar to those of the first aspect.

BRIEF DESCRIPTION OF DRAWING(S)

Figure 8:
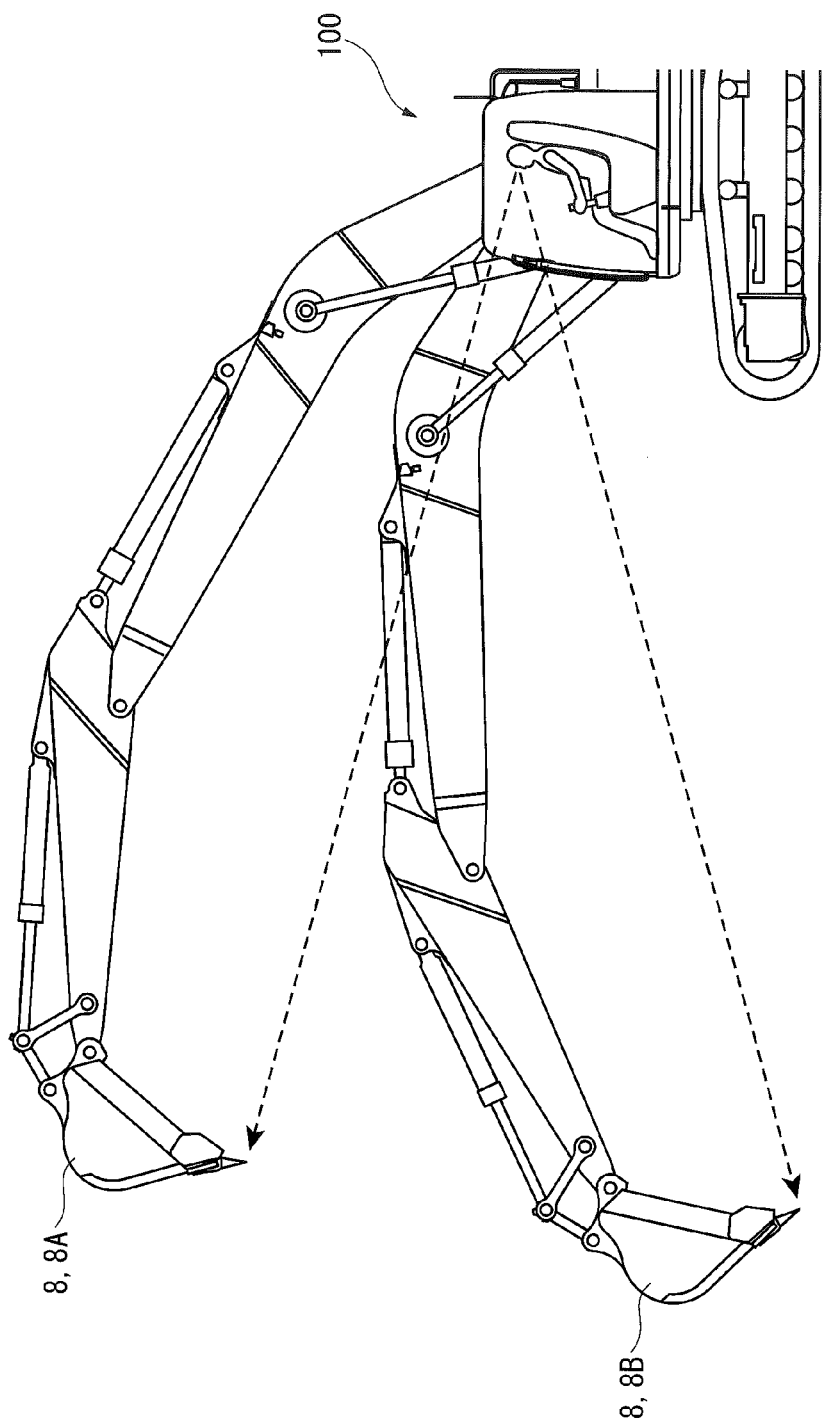

FIG. 8 schematically shows a position of a bucket of the construction machine.

Figure 9:
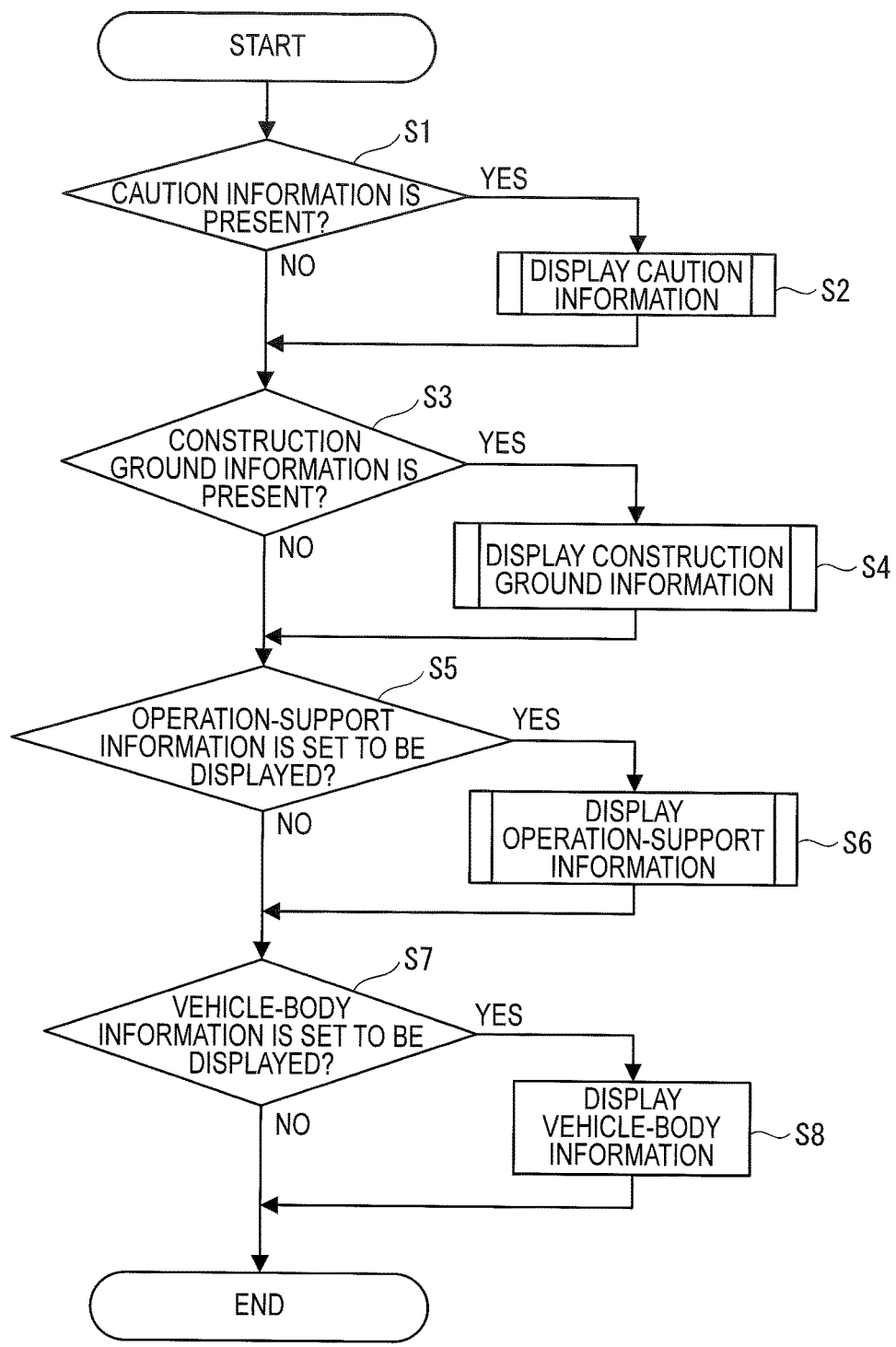

FIG. 9 is a flow chart showing a display control method of the guide image.

Figure 10:
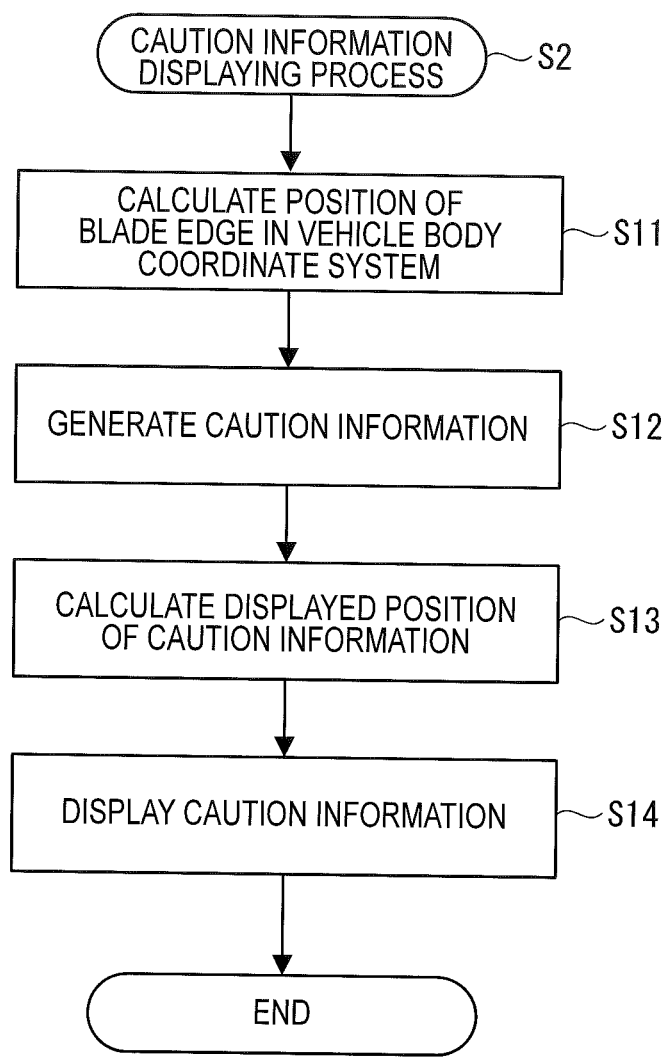

FIG. 10 is a flow chart of a caution information displaying process.

Figure 11:
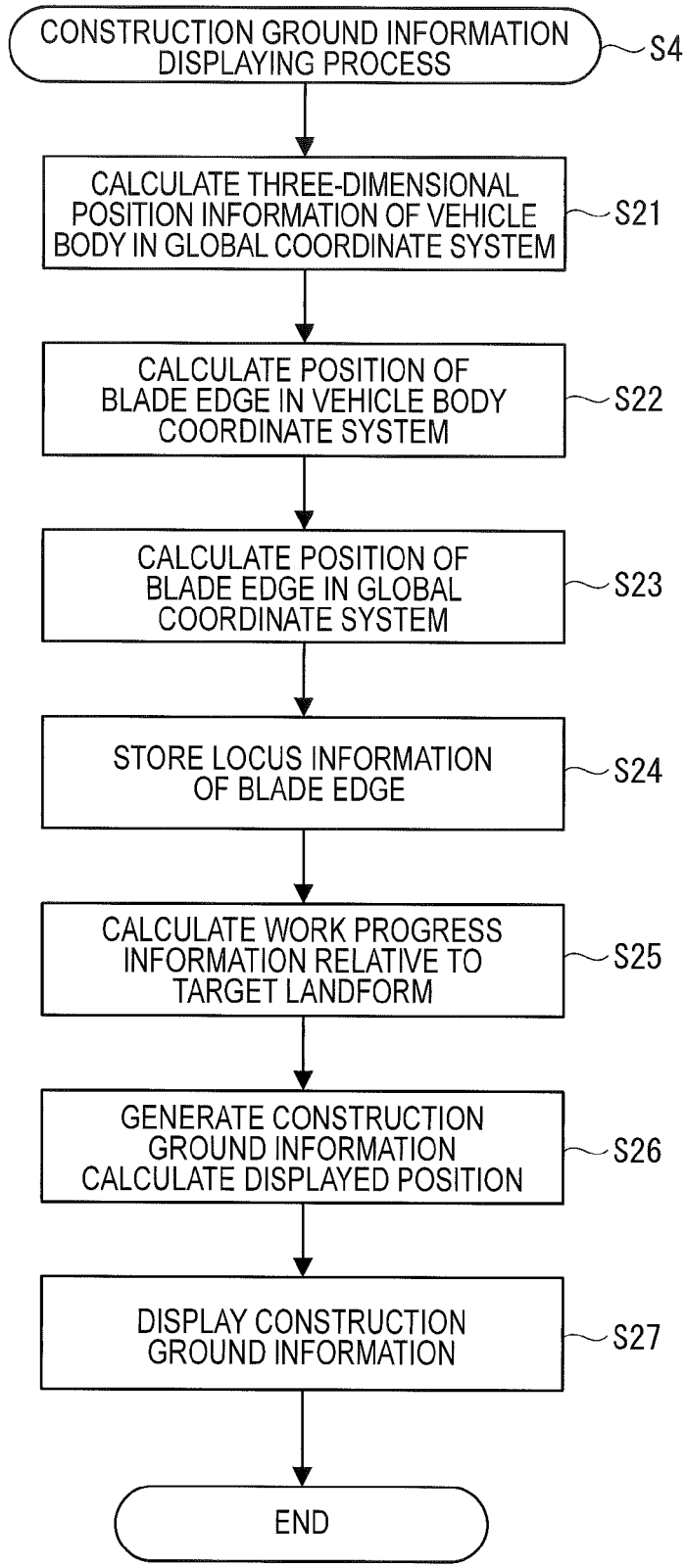

FIG. 11 is a flow chart showing a construction ground information displaying process.

Figure 12:
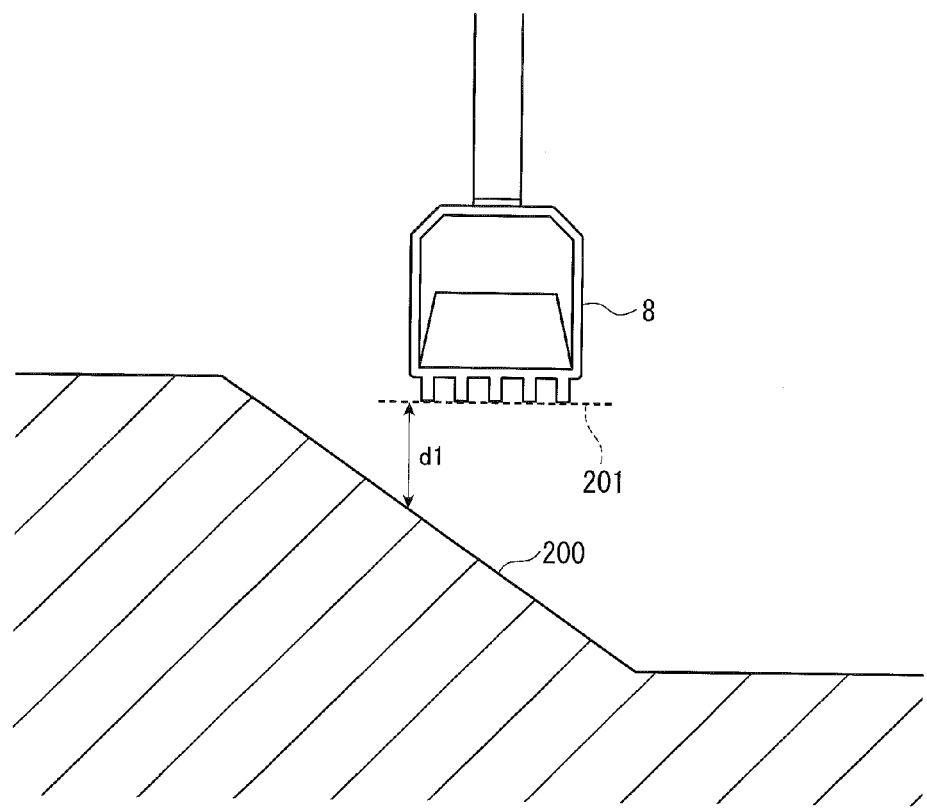

FIG. 12 is a view for explaining a method of calculating locus information of the bucket.

Figure 13:
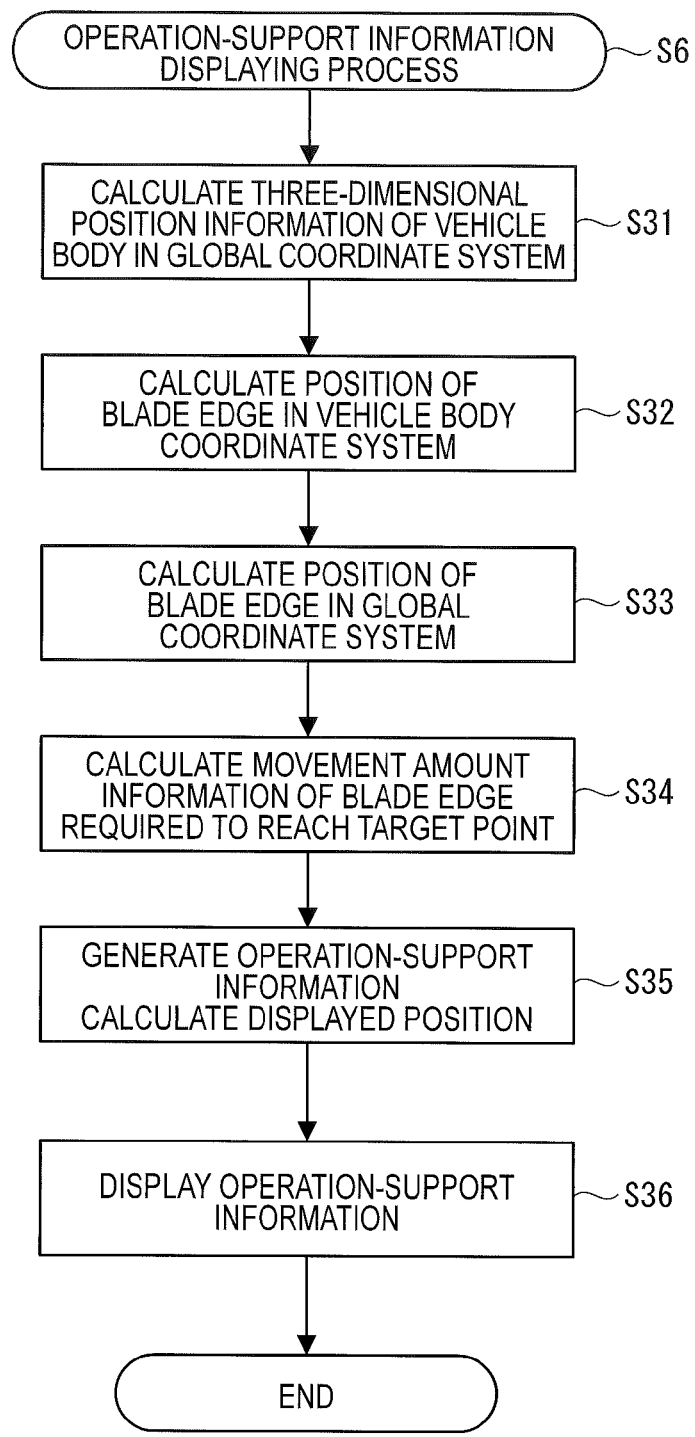

FIG. 13 is a flow chart showing an operation-support information displaying process.

DESCRIPTION OF EMBODIMENT(S)

Exemplary embodiment(s) of the invention will be described below with reference to the attached drawings.

1. Overall Arrangement of Hydraulic Excavator

Description will be made on a display system for a hydraulic excavator according to an exemplary embodiment (i.e., an example of a display system for a construction machine according to the invention) with reference to the attached drawings.

Figure 1:
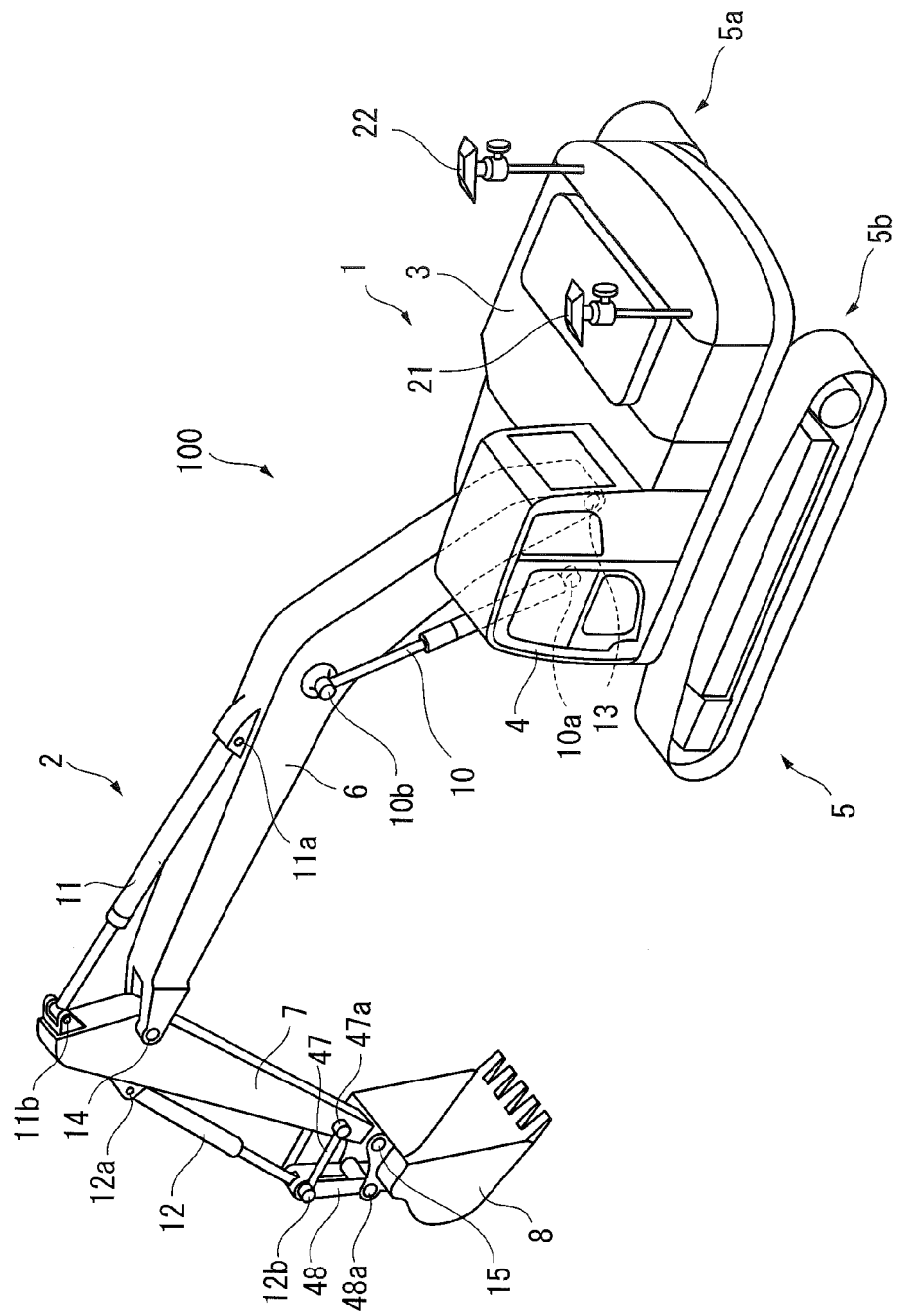
FIG. 1 is a perspective view of a construction machine according to an exemplary embodiment of the invention.

FIG. 1 is a perspective view showing a hydraulic excavator 100 provided with a display system. The hydraulic excavator 100 includes a vehicle body 1 and working equipment 2. The vehicle body 1 functions as a body according to the invention. The vehicle body 1 includes a rotary upper structure 3, a cab 4 and an undercarriage 5. The upper structure 3 is rotatably mounted on the undercarriage 5. In the upper structure 3, devices such as an engine and a hydraulic pump (not shown) are housed. The cab 4 is provided to a front portion of the upper structure 3. A display 38 and an operation device 25 (described later) are disposed in the cab 4 (see FIG. 3). The undercarriage 5 includes right and left crawler belts 5a, 5b, and the hydraulic excavator 100 travels by the rotation of the crawler belts 5a, 5b.

The working equipment 2, which is attached to the front portion of the vehicle body 1, includes a boom 6, an arm 7, a bucket 8, a boom cylinder 10, an arm cylinder 11 and a bucket cylinder 12.

The boom 6 has a base end swingably attached to the front portion of the vehicle body 1 with a boom pin 13. The boom pin 13 thus functions as a center of oscillation of the boom 6 relative to the upper structure 3.

The arm 7 has a base end swingably attached to a distal end of the boom 6 with an arm pin 14. The arm pin 14 thus functions as a center of oscillation of the arm 7 relative to the boom 6.

The bucket 8 is swingably attached to a distal end of the arm 7 with a bucket pin 15. The bucket pin 15 thus functions as a center of oscillation of the bucket 8 relative to the arm 7.

Figure 2A:
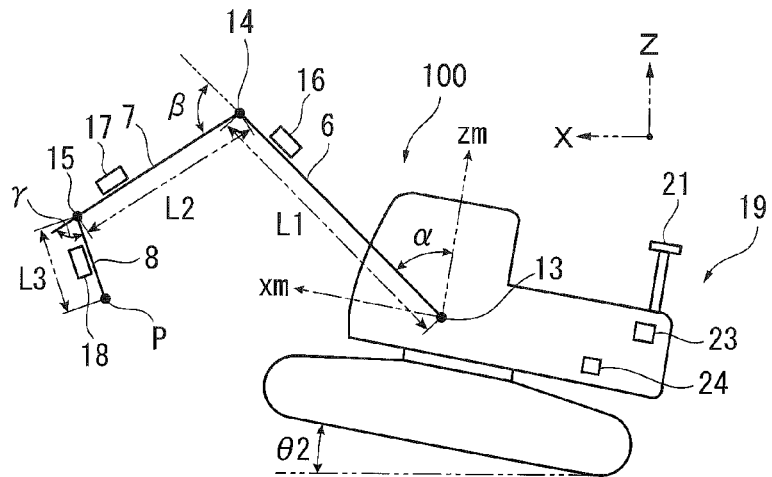
FIG. 2A is a side view schematically showing an arrangement of the construction machine.
Figure 2B:
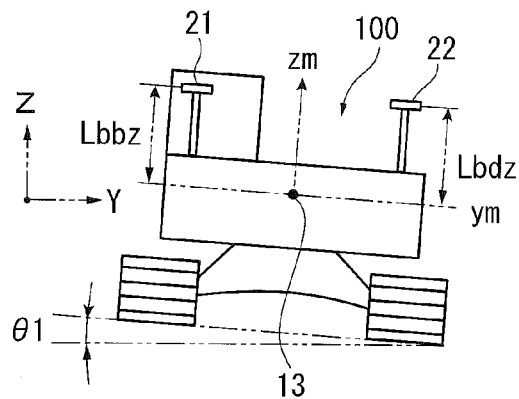
FIG. 2B is a rear view schematically showing the arrangement of the construction machine.
Figure 2C:
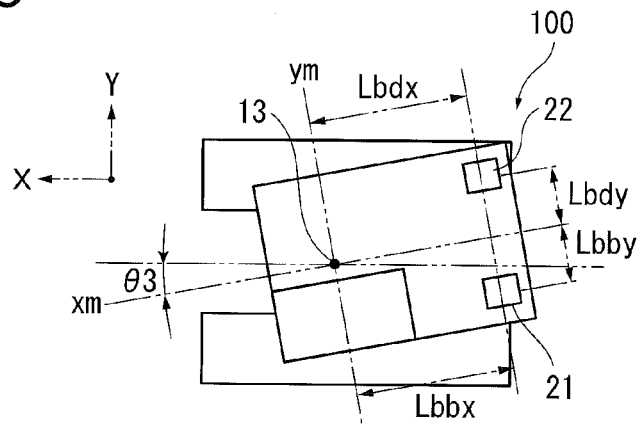
FIG. 2C is a top view schematically showing the arrangement of the construction machine.

FIGS. 2A to 2C schematically show an arrangement of the hydraulic excavator 100. FIG. 2A is a side view of the hydraulic excavator 100. FIG. 2B is a rear view of the hydraulic excavator 100. FIG. 2C is a top view of the hydraulic excavator 100. As shown in FIG. 2A, L1 denotes a length of the boom 6 defined from the boom pin 13 to the arm pin 14. L2 denotes a length of the arm 7 defined from the arm pin 14 to the bucket pin 15. L3 denotes a length of the bucket 8 defined from the bucket pin 15 to a blade edge P of the bucket 8.

The boom cylinder 10, the arm cylinder 11 and the bucket cylinder 12 shown in FIG. 1 are hydraulic cylinders that are hydraulically driven. The boom cylinder 10 has a base end swingably attached to the upper structure 3 with a boom cylinder foot pin 10a. The boom cylinder 10 has a distal end swingably attached to the boom 6 with a boom cylinder top pin 10b. The boom cylinder 10 is hydraulically extended/retracted to drive the boom 6.

The arm cylinder 11 has a base end swingably attached to the boom 6 with an arm cylinder foot pin 11a. The arm cylinder 11 has a distal end swingably attached to the arm 7 with an arm cylinder top pin 11b. The arm cylinder 11 is hydraulically extended/retracted to drive the arm 7.

The bucket cylinder 12 has a base end swingably attached to the arm 7 with a bucket cylinder foot pin 12a. The bucket cylinder 12 has a distal end swingably attached to a first end of a first link member 47 and a first end of a second link member 48 with a bucket cylinder top pin 12b. A second end of the first link member 47 is swingably attached to the distal end of the arm 7 with a first link pin 47a. A second end of the second link member 48 is swingably attached to the bucket 8 with a second link pin 48a. The bucket cylinder 12 is hydraulically extended/retracted to drive the bucket 8.

Figure 3:
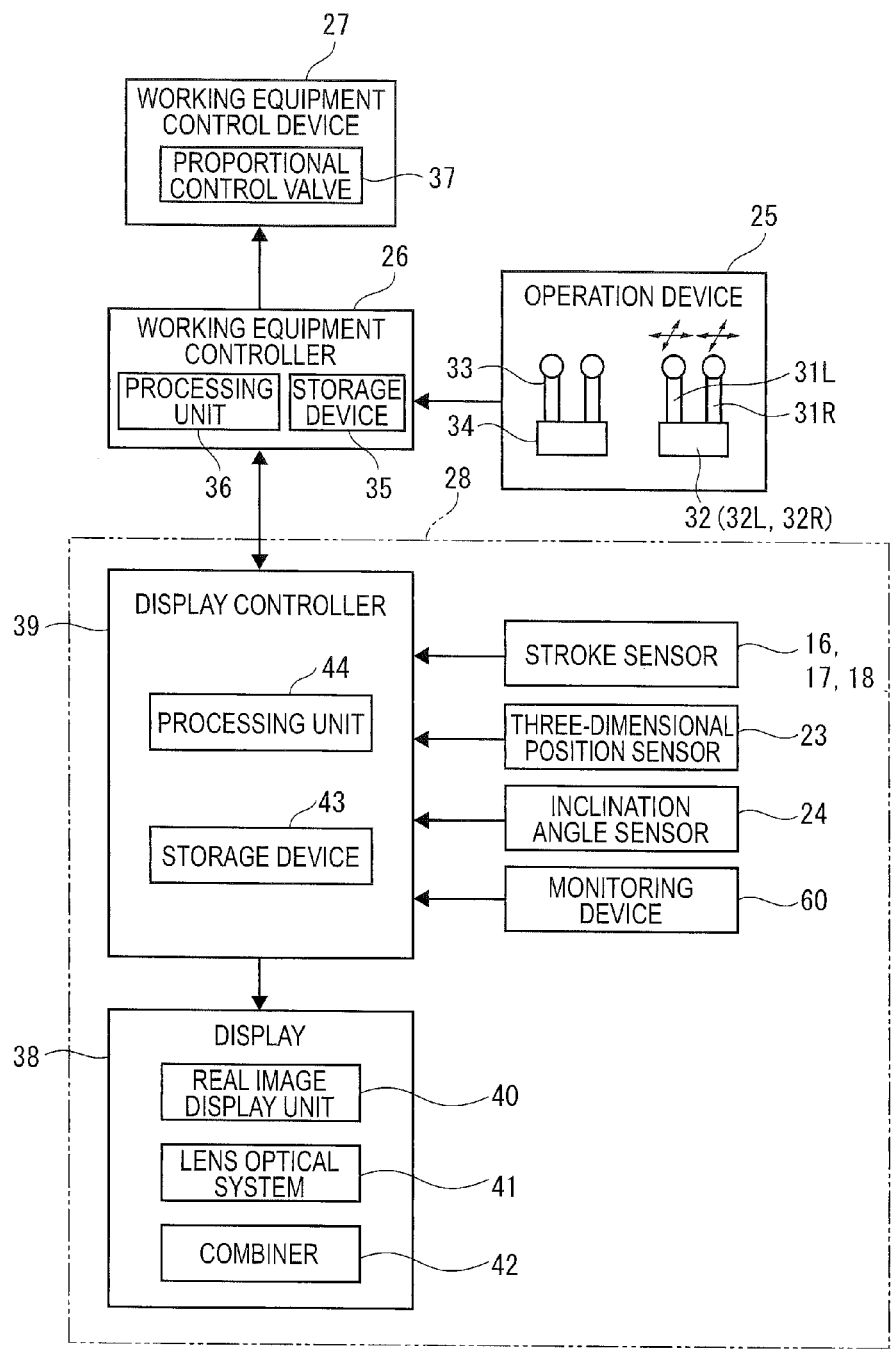
FIG. 3 is a block diagram showing an arrangement of a control system in the construction machine.

A proportional control valve 37 is disposed between the hydraulic cylinders including the boom cylinder 10, the arm cylinder 11 and the bucket cylinder 12 and a hydraulic pump (not shown) (see FIG. 3). The proportional control valve 37 is controlled by a working equipment controller 26 (described later) to adjust the flow rate of a hydraulic oil supplied to each of the hydraulic cylinders 10 to 12. The operation of each of the hydraulic cylinders 10 to 12 is thus controlled.

As shown in FIG. 2A, the boom 6, the arm 7 and the bucket 8 are respectively provided with first to third stroke sensors 16 to 18.

The first stroke sensor 16 detects a stroke length of the boom cylinder 10. A display controller 39 (described later) (see FIG. 3) calculates a swing angle $\alpha$ of the boom 6 relative to a zm-axis of a vehicle body coordinate system (described later) from the stoke length of the boom cylinder 10 detected by the first stroke sensor 16.

The second stroke sensor 17 detects a stroke length of the arm cylinder 11. The display controller 39 calculates a swing angle $\theta$ of the arm 7 relative to the boom 6 from the stroke length of the arm cylinder 11 detected by the second stroke sensor 17.

The third stroke sensor 18 detects a stroke length of the bucket cylinder 12. The display controller 39 calculates a swing angle $\gamma$ of the bucket 8 relative to the arm 7 from the stroke length of the bucket cylinder 12 detected by the third stroke sensor 18.

The first to third stroke sensors 16 to 18 serve to detect position information of the blade edge P of the bucket 8 of the working equipment 2 relative to the vehicle body 1 as described later. The first to third stroke sensors 16 to 18 thus function as a working equipment position detector according to the invention.

As shown in FIG. 2A, the vehicle body 1 is provided with a position detector 19. The position detector 19 detects the current position of the hydraulic excavator 100. The position detector 19 includes two antennas 21, 22 for RTK-GNSS (Real Time Kinematic-Global Navigation Satellite Systems), a three-dimensional position sensor 23, and an inclination angle sensor 24.

The antennas 21, 22 are spaced from each other at a predetermined distance along a ym-axis of the vehicle body coordinate system: xm-ym-zm (described later). A signal corresponding to a GNSS radio wave received by the antennas 21, 22 is inputted into the three-dimensional position sensor 23. The three-dimensional position sensor 23 detects the installation position of each of the antennas 21, 22 according to a global coordinate system.

It should be noted that the global coordinate system, which is a coordinate system based on GNSS measurement, is defined with its origin fixed on the earth. In contrast, the vehicle body coordinate system (described later) is a coordinate system defined with its origin fixed in the vehicle body 1 (specifically, the upper structure 3). The two antennas 21, 22 are intended to detect the current position and orientation of the vehicle body 1 (specifically, the upper structure 3). Based on the position of each of the two antennas 21, 22, the position detector 19 detects an azimuth (direction angle) of an xm-axis of the vehicle body coordinate system (described later) in the global coordinate system.

As shown in FIG. 3, the vehicle body 1 includes the inclination angle sensor 24. As shown in FIG. 2B, the inclination angle sensor 24 detects an inclination angle $\theta 1$ (hereinafter, referred to as "roll angle $\theta 1$") of a width direction (i.e., right-and-left direction) of the vehicle body 1 relative to a gravity direction (vertical line). As shown in FIG. 2A, the inclination angle sensor 24 also detects an inclination angle $\theta 2$ (hereinafter, referred to as "pitch angle $\theta 2$") of a front-and-rear direction of the vehicle body 1 relative to the gravity direction. The inclination angle sensor 24 also detects a rotary angle of the upper structure 3, i.e., an inclination angle (hereinafter, referred to as "yaw angle $\theta 3$") around the vertical axis (the zm-axis) of the vehicle body coordinate system.

It should be noted that the width direction of the vehicle body 1, which means a width direction of the bucket 8, is identical to a vehicle-width direction. However, when the working equipment 2 includes a tilt bucket, the width direction of the bucket 8 may be different from the vehicle-width direction.

The position detector 19, which includes the antennas 21, 22, the three-dimensional position sensor 23 and the inclination angle sensor 24, detects three-dimensional position information of the vehicle body including the current position, orientation and inclination angle of the vehicle body 1 according to the global coordinate system. The current position of the vehicle body 1 according to the global coordinate system is represented as data in the form of latitude, longitude and altitude. The orientation of the vehicle body 1 according to the global coordinate system is represented as an azimuth. The inclination angles are represented as the roll angle $\theta 1$, the pitch angle $\theta 2$ and the yaw angle $\theta 3$.

FIG. 3 is a block diagram showing an arrangement of a control system in the hydraulic excavator 100. The hydraulic excavator 100 includes the operation device 25, the working equipment controller 26, a working equipment control device 27 and a display system 28.

The operation device 25 includes: operation members 31L, 31R for operating the working equipment 2 and the upper structure 3; an operation detector 32 that detects the movement of the operation members 31L, 31R; a travel-control member 33; and a travel-control detector 34. The operation members 31L, 31R, which may be control levers, are moved by an operator to operate the working equipment 2 and the upper structure 3.

The operation member 31R is moved to operate the boom 6 and the bucket 8 of the working equipment 2. Specifically, a movement of the operation member 31R in the front-and-rear direction corresponds to a vertical movement of the boom, whereas a movement of the operation member 31R in the right-and-left direction corresponds to a digging operation and a discharge operation of the bucket.

The operation member 31L is moved to operate the upper structure 3 and the arm 7. Specifically, a movement of the operation member 31L in the front-and-rear direction corresponds to a digging operation and a discharge operation of the arm, whereas a movement of the operation member 31L in the right-and-left direction corresponds to the turning of the upper structure 3 in the right-and-left direction.

The operation detector 32 includes: operation detector 32L that detects the movement of the operation member 31L; and an operation detector 32R that detects the movement of the operation member 31R. The operation detectors 32L, 32R may be a potentiometer (not shown) provided to each of the operation members 31L, 31R to detect a detection angle. The operation detectors 32L, 32R detect the inclination angles in the form of electric signals in accordance with the movements of the operation members 31L, 31R, and send the electric signals as detection signals to the working equipment controller 26. The operation members 31L, 31R may each generate a pilot flow rate in accordance with an operation signal so that the operation detectors 32L, 32R each detect a pilot pressure and send the pilot pressure as a detection signal.

The travel-control member 33, which may be a control lever, is moved by the operator to control the travel of the hydraulic excavator 100. The travel-control detector 34 generates a pilot flow rate in accordance with the movement of the travel-control member 33. A flow rate to be supplied to a running motor is determined based on the pilot pressure to drive the undercarriage 5.

The working equipment controller 26 includes a storage device 35 (e.g., RAM or ROM) and a processing unit 36 (e.g., CPU). The working equipment controller 26 mainly controls the operation of the working equipment 2 and the turning of the upper structure 3. The working equipment controller 26 generates a control signal for operating the working equipment 2 and turning the upper structure 3 in accordance with the movement of the operation members 31L, 31R, and outputs the control signal to the working equipment control device 27.

The working equipment control device 27 includes the proportional control valve 37, which is controlled based on the control signal from the working equipment controller 26. A hydraulic oil with a flow rate corresponding to the control signal from the working equipment controller 26 is discharged from the proportional control valve 37 and supplied to the hydraulic cylinders 10 to 12 and a swing motor (not shown). The hydraulic cylinders 10 to 12 and the swing motor are driven with the hydraulic oil supplied from the proportional control valve 37. In this manner, the working equipment 2 is operated and the upper structure 3 is turned.

2. Arrangement of Display System

The display system 28 is intended to provide the operator with various information including caution information, operation guidance, construction ground information, vehicle-body information and the like. The display system 28 includes the display 38, the display controller 39, the various sensors 16, 17, 18, 23, 24 and a monitoring device 60 (described later).

Figure 4:
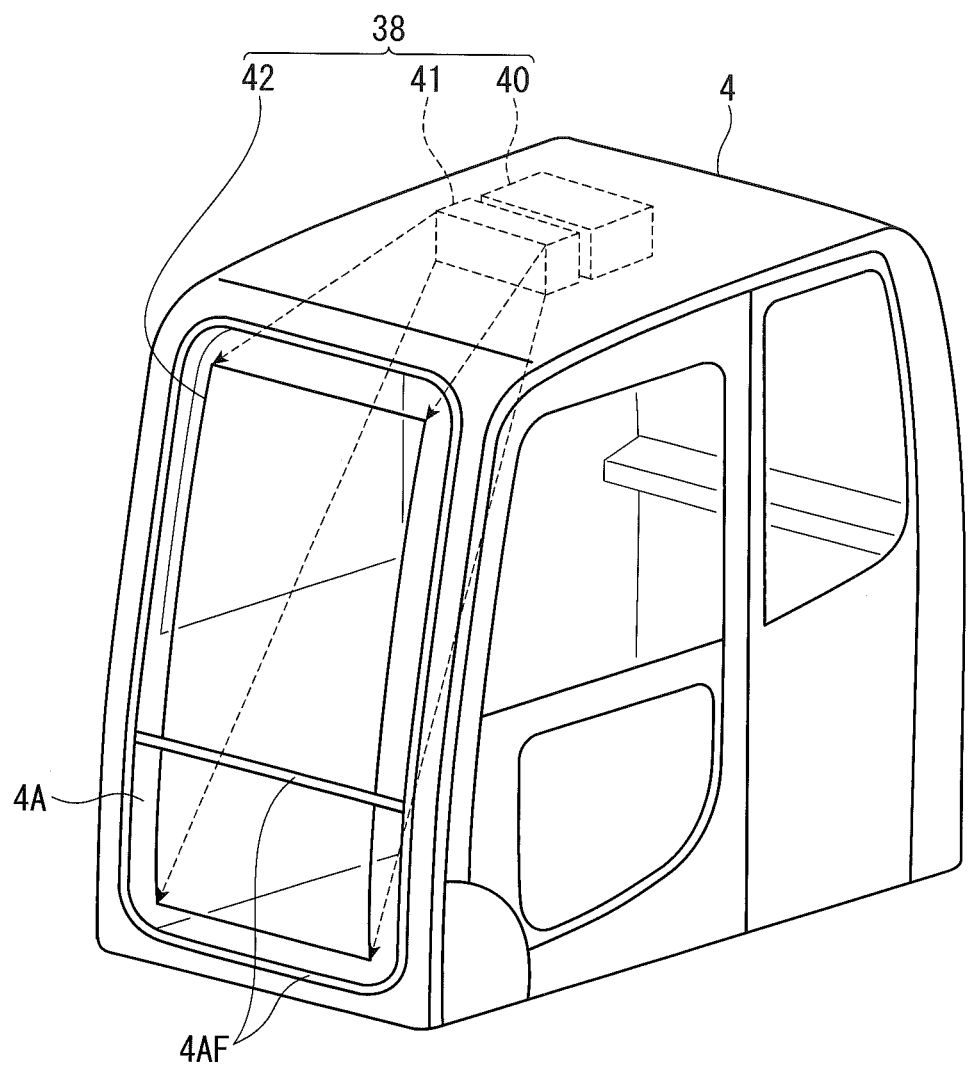
FIG. 4 is a perspective view showing a cab of the construction machine.
Figure 5:
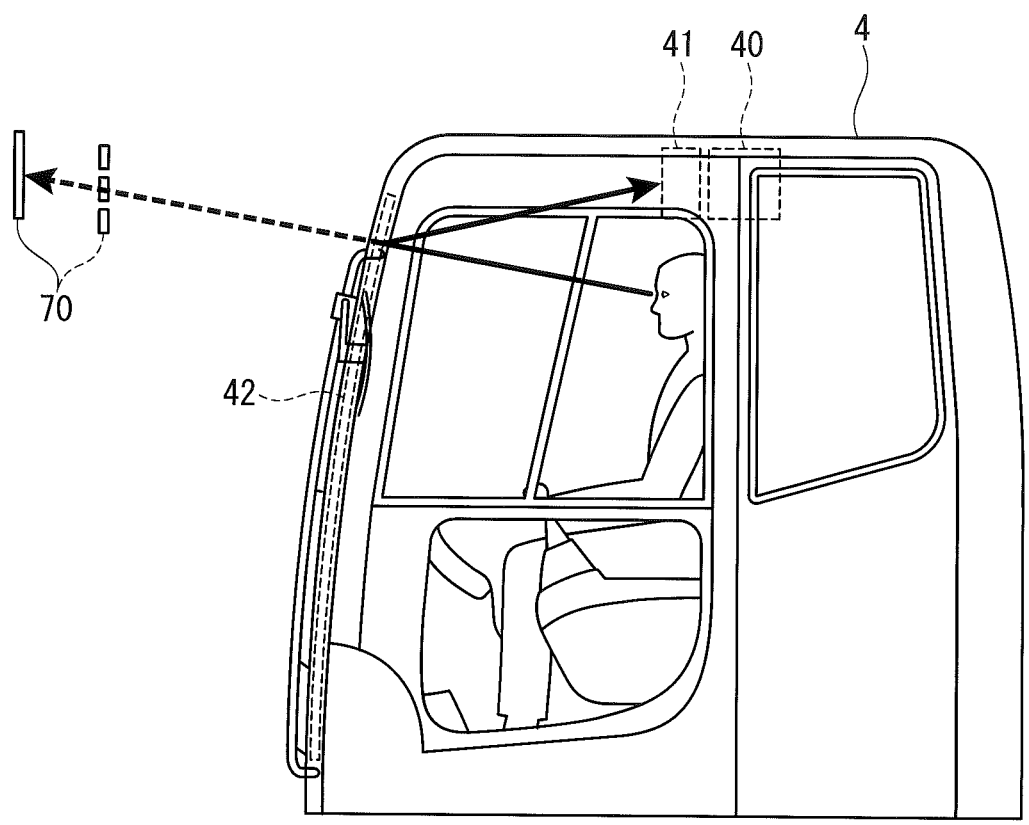
FIG. 5 is a side view showing the cab of the construction machine.

As shown in FIGS. 4 and 5, the display 38 includes a real image display unit 40, a lens optical system 41 and a combiner 42. The real image display unit 40 is a display capable of displaying a real image, such as a liquid crystal display, an organic EL display, a projector and a screen. It should be noted that an image may be projected on a light-transmissive screen from a projector behind the screen.

The lens optical system 41, which is disposed between the real image display unit 40 and the combiner 42, includes a plurality of lenses. The lenses of the lens optical system 41 are partly movable in an optical axis direction. The lenses may be driven by a drive mechanism usable for, for instance, a zoom lens for a camera.

A front window 4A including two vertical parts is disposed within a frame 4AF provided to a front surface of the cab 4. The combiner 42 is a semitransparent mirror provided on the front window 4A, the semitransparent mirror reflecting part of light and transmitting the rest of the light. The combiner 42 reflects an image displayed on the real image display unit 40 toward the operator in the cab 4 and transmits external light into the cab 4.

As a result, the operator can see a virtual image 70 produced by superimposing a real image displayed on the real image display unit 40 on a view in front of the cab 4 visible through the combiner 42. The display 38 thus functions as a so-called head-up display allowing an image to be directly inserted in an operator's field of view.

It should be noted that the combiner 42 may exhibit a lens effect so as to magnify the virtual image 70 visible to the operator and/or change a displayed position of the virtual image 70. In the exemplary embodiment, a concave semitransparent mirror is employed as the combiner 42 so that the combiner 42 exhibits the lens effect.

Further, in the exemplary embodiment, the lenses of the lens optical system 41 are partially movable in the optical axis direction under the control of the display controller 39, thereby changing a depthwise displayed position of the virtual image 70 visible to the operator (i.e., a distance from the viewpoint of the operator to the virtual image 70 displayed forward in the cab). In other words, when the lens optical system 41 is installed, the real image display unit 40 disposed behind the lens optical system 41 should be looked into through the lens optical system 41 in an enlarged manner. When the lenses in the lens optical system 41 are partly moved in the optical axis direction, an effect similar to one resulting from changing a depthwise position of the real image display unit 40 (i.e., a distance from the combiner 42 to the real image display unit 40) is provided. Consequently, the depthwise displayed position of the virtual image 70 is changed. In FIG. 5, the depthwise displayed position of the virtual image 70 shown by the dotted line is different from the depthwise displayed position of another virtual image 70 shown by the solid line.

Further, since the size of the virtual image 70 depends on the size of an exit window of the lens optical system 41, the size of the virtual image 70 on the viewing angle of the operator can be maintained irrespective of whether or not the depthwise displayed position of the virtual image 70 is changed.

It should be noted that in order to change the depthwise displayed position of the virtual image 70, a linear actuator or the like may be employed in place of the lens optical system 41, so that the real image display unit 40 can be moved toward or away from the combiner 42 to change the distance between the real image display unit 40 and the combiner 42.

The display controller 39 performs various functions of the display system 28. The display controller 39 and the working equipment controller 26 can communicate with each other through a wire or wirelessly.

The display controller 39 includes a storage device 43 (e.g., RAM or ROM) and a processing unit 44 (e.g., CPU).

The storage device 43 stores three-dimensional target landform information. The target landform information, which shows form and position of a work ground to be achieved (i.e., a landform as designed), is represented by polygons such as triangle and rectangle.

The processing unit 44 performs various calculations to generate work-support information from the target landform information stored in the storage device 43, the three-dimensional position information of the vehicle body 1 detected by the position detector 19, and the position information of the blade edge of the bucket 8 detected by the first to third stroke sensors 16 to 18 (the working equipment position detector). The display controller 39 displays the work-support information for the operator on the real image display unit 40. The display controller 39 thus functions as a display controller according to the invention.

3. Guide Image

Figure 6:
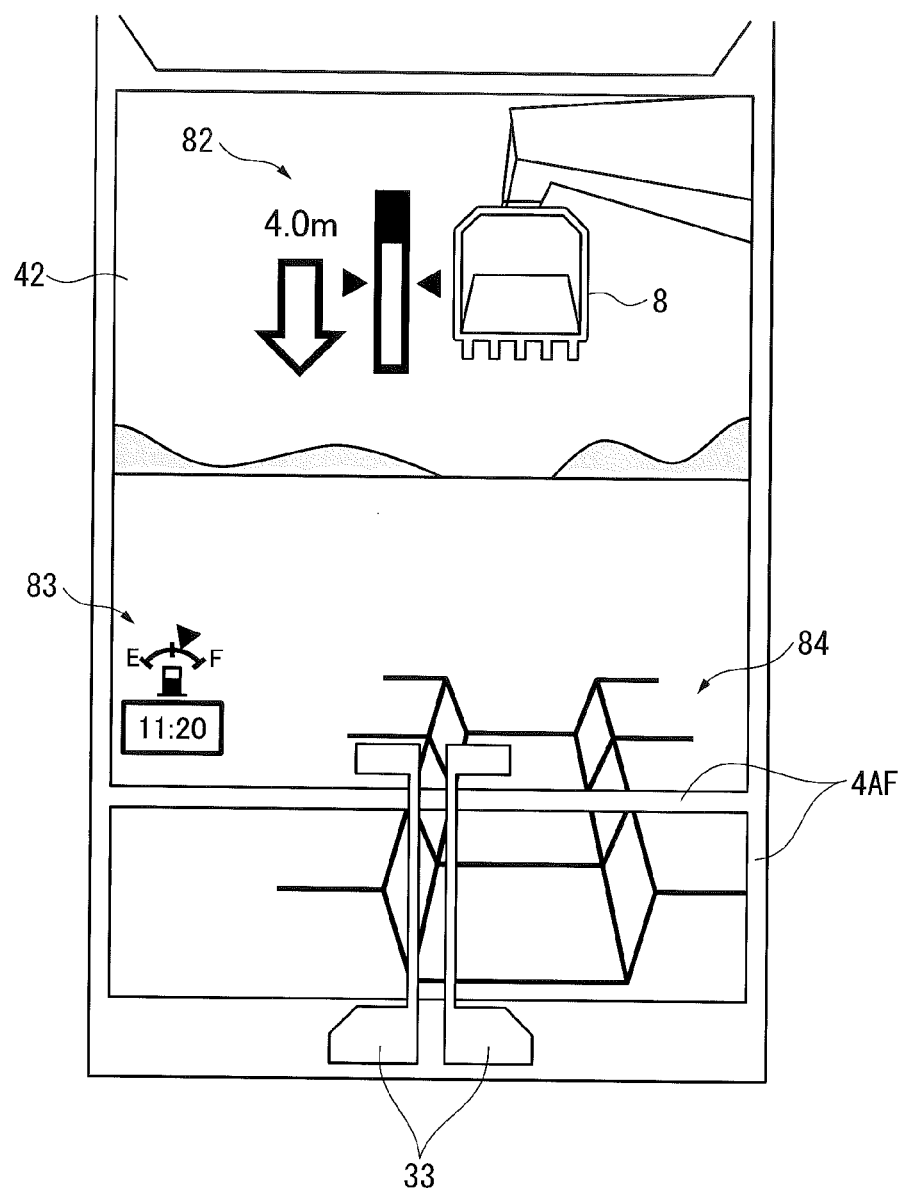
FIG. 6 shows an example of a guide image displayed on a display in the construction machine.

A guide image displayed on the display 38 will be described below in detail. As shown in FIG. 6, the guide image shows vehicle-body information 83 and construction ground information 84 as well as the operation-support information 82 as the work-support information. Further, as shown in FIG. 7, the guide image also shows caution information 81 as the work-support information, as needed.

The caution information 81 is outputted from the monitoring device 60 connected to the display controller 39. The monitoring device 60, which includes a sensor or the like for detecting various conditions of the hydraulic excavator 100, outputs the caution information 81 to the display controller 39 when detection data has abnormality. For instance, the monitoring device 60 includes a sensor that detects the discharge pressure of the hydraulic pump, a sensor that detects the temperature of an engine cooling water, and a contamination sensor. The monitoring device 60 also includes a proximity sensor that detects whether or not an obstacle (e.g., a person) gets close to the hydraulic excavator 100.

Based on data obtained from the above sensors, the monitoring device 60 generates the caution information 81 for cautioning the operator, and outputs the caution information 81 to the display controller 39. Upon reception of the caution information 81 from the monitoring device 60, the display controller 39 immediately displays the caution information 81 on the real image display unit 40. In other words, the caution information 81 is top priority information to be displayed.

Figure 7:
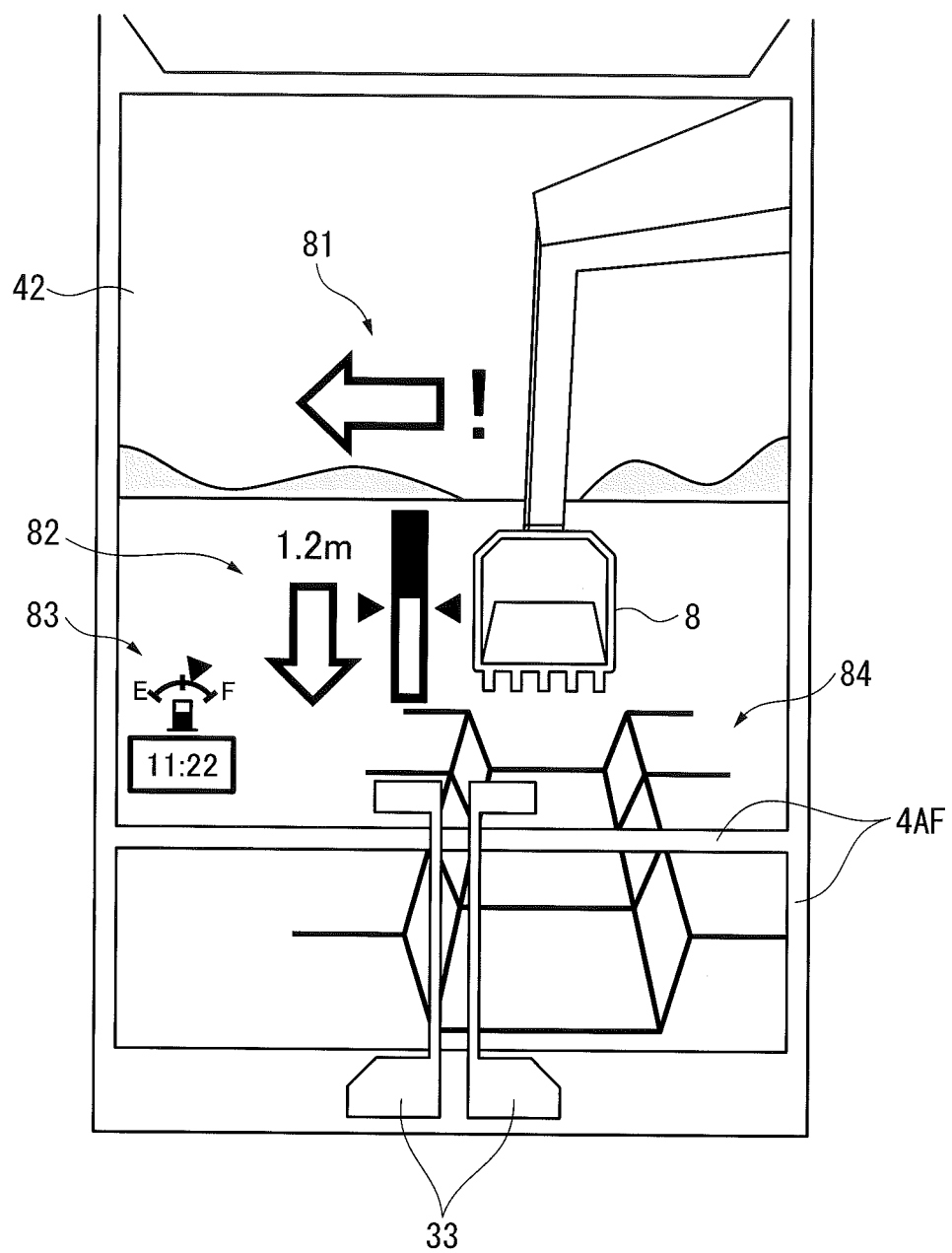
FIG. 7 shows another example of the guide image displayed on the display in the construction machine.

FIG. 7 shows an example of the caution information 81 to be displayed when an obstacle (e.g., a person) is detected at the left of the hydraulic excavator 100.

The operation-support information 82 is guidance information for supporting the operation of the working equipment 2. For instance, the processing unit 44 of the display controller 39 calculates movement direction and movement amount of the working equipment 2 with reference to the three-dimensional position information of the vehicle body 1 detected by the position detector 19, the position information of the blade edge of the bucket 8 of the working equipment 2 detected by the first to third stroke sensors 16 to 18, and the target landform information stored in the storage device 43, as described later. The display controller 39 then generates the operation-support information 82 from the movement direction and movement mount of the working equipment 2, and displays the operation-support information 82 on the real image display unit 40.

For instance, the operation-support information 82 shown in FIG. 6 is to be displayed when the bucket 8 of the hydraulic excavator 100 is present at a position of a bucket 8A shown in FIG. 8. The operation-support information 82 shown in FIG. 6 indicates that the bucket 8 should be downwardly moved by 4 meters because the bucket 8 is upwardly away from an target landform by 4 meters. The operation-support information 82 shown in FIG. 7 is to be displayed when the bucket 8 is present at a position of a bucket 8B. The operation-support information 82 shown in FIG. 7 shows a remaining amount for the bucket 8 to be moved.

It should be noted that the operation-support information 82 may be represented by an arrow indicating the movement direction of the bucket 8 and digits indicating the movement distance of the bucket 8, or may alternatively be represented by a triangular mark indicating a target movement position (level) and a bar indicating the current position of the bucket 8. In FIGS. 6 and 7, the above two display types are employed in combination, but at least either one of them may be usually employed.

The vehicle-body information 83 includes, for instance, data of a fuel gauge, the current time, and a remaining operating time available with the current fuel amount. The operator can set, for instance, whether to display the vehicle-body information 83 and a data type to be displayed, and the setting information is stored in the storage device 43. When the vehicle-body information 83 is set to be displayed, the display controller 39 displays specified information. It should be noted that a displayed position of the vehicle-body information 83 is fixed without being changed along with the position of the blade edge of the bucket 8.

The construction ground information 84 is generated from the target landform information and locus information of the blade edge of the bucket 8. Specifically, before a construction work, based on the target landform information and the three-dimensional position information detected by the position detector 19, the display controller 39 displays the target landform information as the construction ground information 84 on the real image display unit 40. As a result, the operator can see from his/her viewpoint the target landform information superimposed on the work ground visible through the combiner 42.

In contrast, during or after the construction work, the display controller 39 generates the construction ground information 84 by superimposing not only the target landform information but also the locus information of the blade edge of the bucket 8 to show information about a landform in progress.

The guide image displayed on the real image display unit 40 is reflected by the combiner 42 through the lens optical system 41 to be visible to the operator. The operator can thus see the guide image superimposed on a view in front of the front window 4A (i.e., a view of a construction site) visible through the combiner 42.

The display controller 39 displays the caution information 81 and the operation-support information 82 in accordance with the position of the bucket 8 of the working equipment 2. Displayed positions of the caution information 81 and the operation-support information 82 along a surface of the combiner 42 and depthwise displayed positions of the caution information 81 and the operation-support information 82 are thus changed along with the movement of the bucket 8.

The display controller 39 fixedly displays the vehicle-body information 83 on the real image display unit 40 at a predetermined position. It should be noted that the displayed position of the vehicle-body information 83 may be changed in accordance with the position of the bucket 8 in the same manner as the caution information 81 and the operation-support information 82.

The display controller 39 displays the construction ground information 84 along the work ground.

4. Display Control Method of Guide Image

Next, a display control method of the guide image will be described with reference to a flow chart of FIG. 9. During a construction work performed by the hydraulic excavator 100, the display controller 39 repeats a display control of the guide image as shown in FIG. 9 at regular intervals (e.g., every 0.1 seconds), and changes the content of the guide image, for instance, approximately every one second.

Display of Caution Information

At the start of the display control of the guide image, the processing unit 44 of the display controller 39 determines whether or not the monitoring device 60 outputs the caution information 81 (whether or not the caution information 81 is present) (step S1). When the caution information 81 is present, the processing unit 44 displays the caution information 81 (step S2). Since the displaying process of the caution information 81 is performed at the start of the display control, the caution information 81 can be preferentially displayed to promptly present the caution information to the operator. The caution information displaying process will be described later in detail. It should be noted that when the caution information 81 is outputted from the monitoring device 60 during a displaying process of any other information, the displaying process of any other information may be interrupted by the displaying process of the caution information 81 (step S2).

Display of Construction Ground Information

After performing the displaying process of the caution information 81 in step S2 or when the caution information 81 is absent (No in step S1), the processing unit 44 determines whether or not the construction ground information 84 is stored in the storage device 43 (step S3). The presence or absence of the construction ground information 84 is determined because the construction ground information 84 may be absent for some construction sites.

When the construction ground information 84 is present, the processing unit 44 performs a displaying process of the construction ground information 84 (step S4).

Display of Operation-Support Information

After performing the displaying process of the construction ground information 84 in step S4 or when the construction ground information 84 is absent (No in step S3), the processing unit 44 determines whether or not the operation-support information 82 is set to be displayed (step S5).

When the operation-support information 82 is set to be displayed, the processing unit 44 performs a displaying process of the operation-support information 82 (step S6).

Incidentally, the respective displaying processes of steps S2, S4, S6 will be described later in detail.

Display of Vehicle-Body Information

When the determination result is No in step S5 or after the displaying process of step S6 is performed, the processing unit 44 determines whether or not the vehicle-body information 83 is set to be displayed (step S7).

When the vehicle-body information 83 is set to be displayed, the processing unit 44 performs a displaying process of the vehicle-body information 83 (step S8). Specifically, the processing unit 44 controls the real image display unit 40 to display the vehicle-body information (e.g., data of the fuel gauge and the current time) at a predetermined displayed position as shown in FIGS. 6 and 7.

As described above, the processing unit 44 repeats the processes of step S1 to step S8 at predetermined intervals as long as the construction work is continued. The processing unit 44 thus again performs the series of displaying processes from step S1.

4-1. Caution Information Displaying Process S2

Next, the displaying process of the caution information 81 in step S2 will be described with reference to a flow chart of FIG. 10. Incidentally, in the caution information displaying process S2, the position of the blade edge is calculated according to the vehicle body coordinate system of the hydraulic excavator 100, which will be first explained below.

Explanation of Vehicle Body Coordinate System

In the hydraulic excavator 100, the vehicle body coordinate system (xm-ym-zm) is defined with its origin at an intersection point of an axis of the boom pin 13 and a plane of the movement of the working equipment 2 with reference to a detection value of the inclination angle sensor 24, as shown in FIG. 2. The plane of the movement of the working equipment 2 is defined as xm-zm. The vehicle body coordinate system may be defined based on the position data of each of the antennas 21, 22. It should be noted that a position of the boom pin 13 means a position of a midpoint in the vehicle-width direction in the following explanation.

A positional relationship between each of the antennas 21, 22 and the origin of the vehicle body coordinate system (i.e., a positional relationship between each of the antennas 21, 22 and the midpoint of the boom pin 13 in the vehicle-width direction) is determined in advance. Specifically, as shown in FIGS. 2B and 2C, the positional relationship between the origin of the vehicle body coordinate system and the antenna 21 is determined based on: a distance Lbbx between the boom pin 13 and the antenna 21 in the xm-axis direction in the vehicle body coordinate system; a distance Lbby between the boom pin 13 and the antenna 21 in the ym-axis direction in the vehicle body coordinate system; and a distance Lbbz between the boom pin 13 and the antenna 21 in the zm-axis direction in vehicle body coordinate system.

Similarly, the positional relationship between the origin of the vehicle body coordinate system and the antenna 22 is determined based on: a distance Lbdx between the boom pin 13 and the antenna 22 in the xm-axis direction in the vehicle body coordinate system; a distance Lbdy between the boom pin 13 and the antenna 22 in the ym-axis direction in the vehicle body coordinate system; and a distance Lbdz between the boom pin 13 and the antenna 22 in the zm-axis direction in vehicle body coordinate system.

S11: Calculation of Position of Blade Edge in Vehicle Body Coordinate System

The processing unit 44 calculates the position of the blade edge of the bucket 8 in the vehicle body coordinate system (step S11). The processing unit 44 calculates the respective current values of the swing angles α, β, γ of the boom 6, the arm 7 and the bucket 8 from the detection results of the first to third stroke sensors 16 to 18.

Specifically, using the following equations 1, the processing unit 44 calculates coordinates (x, y, z) of the blade edge of the bucket 8 in the vehicle body coordinate system from the swing angles α, β, γ of the boom 6, the arm 7 and the bucket 8 and lengths L1, L2, L3 of the boom 6, the arm 7 and the bucket 8.

$$x = L1 \sin \alpha + L2 \sin(\alpha+\beta) + L3 \sin(\alpha+\beta+\gamma)$$

$$y = 0$$

$$z = L1 \cos \alpha + L2 \cos(\alpha+\beta) + L3 \cos(\alpha+\beta+\gamma) \quad \text{Equations 1}$$

S12: Generation of Caution Information

Next, the processing unit 44 generates a display content of the caution information 81 to be outputted from the monitoring device 60 (S12). For instance, when the proximity sensor of the monitoring device 60 detects an obstacle at the left and outputs detection information about the obstacle, the processing unit 44 generates a left arrow and an exclamation mark as the display content (display image) of the caution information 81. It should be noted that the display content (display image) of the caution information 81 is determined depending on the type of caution information. Specifically, when the operator needs to be cautioned, an exclamation mark is generated. When the operator needs to be informed of a direction to be careful, for instance, when the obstacle is detected as described above, an arrow indicating the direction is generated. When the discharge pressure of the hydraulic pump or the temperature of the engine cooling water reaches an abnormal level, an image (e.g., an icon and/or a character) denoting the object to be cautioned is generated.

S13: Calculation of Displayed Position of Caution Information

Next, the processing unit 44 calculates the displayed position of the caution information 81 in accordance with the current position of the blade edge of the bucket 8 (step S13). The displayed position of the caution information 81, which is defined on a display surface of the combiner 42, should not overlap with the bucket 8 and the operation-support information 82 but be adjacent to the bucket 8.

Further, the displayed position should be adjusted in accordance with the content of the caution information 81. Accordingly, the caution information 81 for cautioning about an obstacle at the left is displayed at a diagonally upper left position relative to the bucket 8, as shown in FIG. 7. The caution information for cautioning about an obstacle at the right is displayed at a diagonally upper right position relative to the bucket 8.

The caution information 81 is shown in the form of a virtual image. The depthwise displayed position of the caution information 81 is represented as a coordinate (x) corresponding to a depthwise direction relative to the operator, and is determined in accordance with a distance from the combiner 42 (i.e., the viewpoint of the operator) to the blade edge of the bucket 8.

S14: Display of Caution Information

Next, the processing unit 44 controls the lens optical system 41 and the real image display unit 40 to display the caution information 81 at the displayed position calculated in step S13 (step S14). The caution information displaying process S2 is completed by performing the processes of S11 to S14.

4-2. Construction Ground Information Displaying Process S4

Next, the displaying process of the construction ground information 84 in step S4 will be described with reference to a flow chart of FIG. 11.

S21: Calculation of Three-Dimensional Position Information of Vehicle Body in Global Coordinate System In displaying the construction ground information 84, the processing unit 44 calculates the three-dimensional position information of the vehicle body 1 in the global coordinate system (step S21).

Specifically, the processing unit 44 calculates the three-dimensional position information of the vehicle body 1 in the global coordinate system (i.e., latitude, longitude, altitude, azimuth, roll angle, pitch angle and yaw angle) from the detection values of the three-dimensional position sensor 23 and the inclination angle sensor 24 (step S21).

The three-dimensional position sensor 23 detects the position of each of the antennas 21, 22 in the global coordinate system (i.e., latitude, longitude and altitude). The processing unit 44 then calculates global coordinates (A, B, C) of the position of the origin of the vehicle body coordinate system from: the positional relationship between the origin of the vehicle body coordinate system and each of the antennas 21, 22; and the coordinates of each of the antennas 21, 22 in global coordinate system detected by the three-dimensional position sensor 23.

Further, since the antennas 21, 22 are disposed along the ym-axis of the vehicle body coordinate system, the processing unit 44 calculates an orientation (azimuth) of the vehicle body 1 (the upper structure 3) from the coordinates of each of the antennas 21, 22 in the global coordinate system.

S22: Calculation of Position of Blade Edge in Vehicle Body Coordinate System

Next, the processing unit 44 calculates the position of the blade edge of the bucket 8 in the vehicle body coordinate system (step S22). A specific calculation method of the position of the blade edge of the bucket 8 in the vehicle body coordinate system is the same as the method in step S11 of the displaying process of the caution information 81, and thus the explanation thereof is omitted.

S23: Calculation of Position of Blade Edge in Global Coordinate System

Next, the processing unit 44 calculates the position of the blade edge of the bucket 8 in the global coordinate system (step S23). The processing unit 44 transforms the coordinates (X, Y, Z) of the blade edge of the bucket 8 in the vehicle body coordinate system calculated by equations 1 into coordinates in the global coordinate system by the following equation 2.

$$\begin{pmatrix} X \\ Y \\ Z \end{pmatrix} = \begin{pmatrix} \cos\kappa\cos\varphi & \cos\kappa\sin\varphi\sin\omega + \sin\kappa\cos\omega & -\cos\kappa\sin\varphi\cos\omega + \sin\kappa\sin\omega \\ -\sin\kappa\cos\varphi & -\sin\kappa\sin\varphi\sin\omega + \cos\kappa\cos\omega & \sin\kappa\sin\varphi\cos\omega + \cos\kappa\sin\omega \\ \sin\varphi & -\cos\varphi\sin\omega & \cos\varphi\cos\omega \end{pmatrix} \begin{pmatrix} x \\ y \\ z \end{pmatrix} + \begin{pmatrix} A \\ B \\ C \end{pmatrix}$$

Equation 2

In the above equation, ω, φ and κ are represented by the following equations 3.

$$\omega = \arcsin\left(\frac{\sin\theta 1}{\cos\varphi}\right)$$
$$\varphi = \theta 2$$
$$\kappa = -\theta 3$$

Equations 3

In the above equations, θ1 represents the roll angle as described above. θ2 represents the pitch angle. θ3 represents the yaw angle.

S24: Storing of Locus Information of Blade Edge

Next, the processing unit 44 stores the position of the blade edge calculated in step S23 in the storage device 43 to store the locus information of the blade edge (step S24).

In order to calculate and display the landform in progress, the blade edge of the bucket 8 should be assumed as a line defined between both ends of the blade edge of the bucket 8 to calculate the locus of the line. Specifically, when the vehicle body 1 is not parallel with a construction ground surface 200 as shown in FIG. 12, locus information of the movement of a line 201 (the blade edge of the bucket 8) is calculated from: a distance dl between the ground and the point in the blade edge of the bucket 8 closest to the ground; and information about an inclination angle of the vehicle body 1 and an inclination angle of the construction ground surface 200 in the global coordinate system.

S25: Calculation of Work Progress Information Relative to Target Landform

Next, the processing unit 44 calculates work progress information relative to the target landform from: the locus information of the blade edge of the bucket 8 stored in the storage device 43; and the target landform information stored in the storage device 43 (step S25).

S26: Generation of Construction Ground Information and Calculation of Displayed Position Next, the processing unit 44 generates a display content of the construction ground information 84 from the target landform information and the work progress information (step S26). The processing unit 44 also calculates a displayed position of the construction ground information 84 from the three-dimensional position information of the vehicle body 1 (step S26).

S27: Display of Construction Ground Information

The processing unit 44 then controls the lens optical system 41 and the real image display unit 40 to display the construction ground information 84 at the displayed position calculated in step S26 (step S27).

The operator can thus see the construction ground information 84 superimposed on the work ground. For instance, before the construction work, the construction ground information 84 shows the target landform, so that the operator can easily understand the landform to be achieved.

Further, during the construction work, the construction ground information 84 additionally shows the work progress information, so that the operator not only can easily understand a positional relationship between an actually visible position of the blade edge of the bucket 8 and the landform to be achieved by digging or the like without looking away from his/her viewpoint, but also can easily see whether or not the work progresses as planned.

It should be noted that in order to display the construction ground information 84 along with the caution information 81 and/or the operation-support information 82, the display controller 39 controls the lens optical system 41 in a manner that the depthwise displayed position of each of the caution information 81 and the operation-support information 82 is preferentially adjusted to that of the bucket 8. In other words, when the depthwise displayed position of each of the caution information 81 and the operation-support information 82 is different from that of the construction ground information 84, the lens optical system 41 is controlled to adjust the depthwise displayed position of each of the caution information 81 and operation-support information 82.

It should be noted that the real image display unit 40 and the lens optical system 41 for displaying the caution information 81 and the operation-support information 82 (i.e., the work-support information), the displayed positions of which are adjustable in accordance with that of the blade edge of the bucket 8, may be provided independently of another real image display unit 40 and another lens optical system 41 for displaying the vehicle-body information 83 and the construction ground information 84, the displayed positions of which are not adjustable in accordance with that of the blade edge of the bucket 8.

4-3. Displaying Process of Operation-Support Information S6

Next, the displaying process of the operation-support information 82 based on the construction ground information 84 related to step S6 will be explained with reference to a flow chart of FIG. 13.

In displaying the operation-support information 82, the processing unit 44 calculates the three-dimensional position information of the vehicle body 1 in the global coordinate system in the same manner as described above (step S31). Subsequently, the processing unit 44 calculates the position of the blade edge in the vehicle body coordinate system (step S32). Next, the processing unit 44 calculates the position of the blade edge in the global coordinate system (step S33). Specific calculation methods in steps S31 to S33 are the same as in steps S21 to S23 of the displaying process of the construction ground information 84, and thus the explanation thereof is omitted. It should be noted that when the displaying process of the operation-support information 82 in step S6 follows the displaying process of construction ground information 84 in step S4, the data calculated in steps S21 to S23 may be used without performing steps S31 to S33.

Next, based on the current position of the blade edge of the bucket 8 in the global coordinate system and the target landform information stored in the storage device 43, the processing unit 44 calculates information about a movement amount of the blade edge required to reach a target point (step S34).

The processing unit 44 then generates a display content of the operation-support information 82 from the movement amount information calculated in step S34, and calculates the displayed position of the operation-support information 82 in accordance with the current position of the blade edge of the bucket 8 (step S35). The displayed position of the operation-support information 82, which is defined on the display surface of the combiner 42, should not overlap with the bucket 8 and the caution information 81 but be adjacent to the bucket 8. Accordingly, in FIGS. 6 and 7, the operation-support information 82 is displayed at a side of the bucket 8. The operation-support information 82 is shown in the form of a virtual image. The depthwise displayed position of the operation-support information 82 is represented as a coordinate (x) corresponding to the depthwise direction relative to the operator, and is determined in accordance with the position of the blade edge of the bucket 8.

Next, the processing unit 44 controls the lens optical system 41 and the real image display unit 40 to display the operation-support information 82 at the displayed position calculated in step S35 (step S36).

In the exemplary embodiment, the display 38, which includes the real image display unit 40, the lens optical system 41 and the combiner 42, can display the work-support information superimposed on a view in front of the cab 4. The operator can thus see the work-support information including the caution information 81 and the operation-support information 82 as well as the bucket 8 of the working equipment 2 with less movement of his/her viewpoint and the focal point of his/her eyes, which results in an improvement in operating efficiency.

The display controller 39 adjusts not only the displayed positions of the caution information 81 and the operation-support information 82 along the surface of the combiner 42 but also the depthwise displayed position of the caution information 81 and the operation-support information 82 in accordance with the position information of the bucket 8. Projection images of the caution information 81 and the operation-support information 82 visible to the operator can thus be displayed around the bucket 8, thereby minimizing the movement of the operator's eyes and the adjustment of the focal point of the operator's eyes. This results in a reduction in a load on the operator for seeing the bucket 8 and the work-support information.

The size of the combiner 42 may be determined in accordance with the size of the front window 4A, so that a display area for various information can be increased as compared with that of a typical monitor. As a result, plural pieces of information can be seamlessly displayed within the area of the combiner 42, whereas a typical monitor requires switching of a screen to display plural pieces of information. Further, even when various work-support information needs to be presented due to computerization, it is not necessary to install an additional monitor in the cab 4, so that a space can be ensured in the cab 4 to maintain the work performance and visibility of the operator.

Modifications of Exemplary Embodiment(s)

It should be understood that the scope of the invention is not limited to the above-described exemplary embodiment(s), but includes modifications and improvements compatible with the invention.

In the exemplary embodiment, the respective inclination angles of the boom 6, the arm 7 and the bucket 8 are detected by the first to third stroke sensors 16 to 18, but may be detected by different detectors. For instance, angle sensors may be provided to detect the respective inclination angles of the boom 6, the arm 7 and the bucket 8.

In the exemplary embodiment, the working equipment 2 includes the bucket 8, but may alternatively include a tilt bucket. With the tilt bucket, which includes a bucket tilt cylinder, can be tilted right and left, a slope or a level ground can be formed or graded as desired even when the hydraulic excavator works in a hilly area. Further, the tilt bucket is capable of performing surface compaction using a bottom plate.

It is not essential that working equipment 2 should include the bucket 8. For instance, the working equipment 2 may include an attachment different from the bucket 8, such as a hydraulic breaker.

The construction machine may be any one of various construction machines with working equipment different from the hydraulic excavator 100, such as a bulldozer, a wheel loader and a motor grader.

The content of the guide image displayed on the real image display unit 40 may be different from that described above. For instance, the content may be determined depending on an attachment type and/or a construction machine type. Part or all of the functions of the display controller 39 may be performed and delivered by a processing unit installed in a base station outside the construction machine.

It is not essential that the operation-support information 82 should be information about a movement amount of the blade edge required to reach a target point. For instance, in lifting the bucket 8 after a digging work, an upward movement amount of the bucket 8 may be displayed as the operation-support information 82. The content of the operation-support information 82 may be determined depending on a working equipment type and/or an operation by the operator.

It is not essential that the construction machine should include a mechanism for detecting the current position in the global coordinate system such as the antennas 21, 22. In the case of absence of the antennas 21, 22, the caution information 81 or the like may be generated and displayed based on information according to the vehicle body coordinate system.

It is not essential that the depthwise displayed position of the work-support information should be adjusted in accordance with the position of the working equipment 2 by moving the lenses of the lens optical system 41 and/or the real image display unit 40. For instance, the display image of the work-support information may be processed to adjust the depthwise displayed position of the projection image visible to the operator.

The invention claimed is:

1. A display system for a construction machine, the construction machine comprising: a working equipment; and a body attached with the working equipment and comprising a cab, the display system comprising:
    a working equipment position detector configured to detect position information of the working equipment relative to the body;
    a real image display unit configured to display work-support information as a real image, the work-support information comprising operation information for guidance of an operation of the working equipment;
    a combiner configured to reflect the real image displayed on the real image display unit into the cab so that the work-support information is displayed as a virtual image superimposed on a view in front of the cab; and a display controller configured to control the real image display unit, wherein based on the position information of the working equipment, the display controller controls a displayed position of the work-support information along a surface of the combiner and a depthwise displayed position of the work-support information defined in a forward direction relative to the cab to display around the working equipment that is positioned within a field of vision of an operator in the cab a projection image of the work-support information visible to the operator.

2. The display system for the construction machine according to claim 1, further comprising:

a position detector configured to detect three-dimensional position information of the body comprising a current position, an orientation and an inclination angle of the body; and a storage device configured to store target landform information of a work ground, wherein the operation information is generated based on: the position information of the working equipment; the three-dimensional position information of the body; and the target landform information.

3. The display system for the construction machine according to claim 1, further comprising:

a position detector configured to detect three-dimensional position information of the body comprising a current position, an orientation and an inclination angle of the body; and a storage device configured to store target landform information of a work ground, wherein the display controller controls the real image display unit to display construction ground information showing a landform in progress in accordance with geometry and position of the work ground, and the construction ground information is generated based on the three-dimensional position information of the body and the target landform information.

4. The display system for the construction machine according to claim 1, further comprising:

a position detector configured to detect three-dimensional position information of the body comprising a current position, an orientation and an inclination angle of the body; and a storage device configured to store target landform information of a work ground and locus information of the working equipment, wherein the display controller controls the real image display unit to display construction ground information indicating a landform in progress in accordance with geometry and position of the work ground, and the construction ground information is generated based on the three-dimensional position information of the body, the target landform information, and work progress information based on the locus information of the working equipment.

5. The display system for the construction machine according to claim 1, further comprising a lens optical system disposed between the real image display unit and the combiner, the lens optical system comprising a plurality of lenses, at least part of which is movable in an optical axis direction, wherein the display controller moves the at least part of the lenses of the lens optical system in the optical axis direction to control the depthwise displayed position of the work-support information.

6. The display system for the construction machine according to claim 1, wherein a distance between the real image display unit and the combiner is changeable, and the display controller changes the distance between the real image display unit and the combiner to adjust the depthwise displayed position of the work-support information.

7. The display system for the construction machine according to claim 1, wherein the work-support information comprises distance information between the working equipment and a work ground.

8. A control method of a display system in a construction machine, the construction machine comprising: a working equipment; and a body attached with the working equipment and comprising a cab, the display system comprising: a real image display unit configured to display work-support information as a real image, the work-support information comprising operation information for guidance of an operation of the working equipment; and a combiner configured to reflect the real image displayed on the real image display unit into the cab so that the work-support information is displayed as a virtual image superimposed on a view in front of the cab, the control method comprising:

detecting position information of the working equipment relative to the body; and controlling, based on the position information of the working equipment, a displayed position of the work-support information along a surface of the combiner and a depthwise displayed position of the work-support information defined in a forward direction relative to the cab to display around the working equipment that is positioned within a field of vision of an operator in the cab a projection image of the work-support information visible to the operator.

9. The control method according to claim 8, wherein the work-support information comprises distance information between the working equipment and a work ground.

10. A display system for a construction machine, the construction machine comprising: a working equipment; and a body attached with the working equipment and comprising a cab, the display system comprising:

a position detector configured to detect three-dimensional position information of the body comprising a current position, an orientation and an inclination angle of the body;

a storage device configured to store target landform information of a work ground;

a working equipment position detector configured to detect position information of the working equipment relative to the body;

a real image display unit configured to display work-support information as a real image;

a combiner configured to reflect the real image displayed on the real image display unit into the cab so that the work-support information is displayed as a virtual image superimposed on a view in front of the cab; and a display controller configured to control the real image display unit, wherein the display controller controls the real image display unit to display construction ground information showing a landform in progress in accordance with geometry and position of the work ground, and the construction ground information is generated based on the three-dimensional position information of the body and the target landform information.

11. The display system for the construction machine according to claim 10, wherein the work-support information comprises operation information for guidance of an operation of the working equipment and distance information between the working equipment and the work ground.

12. A display system for a construction machine, the construction machine comprising: a working equipment; and a body attached with the working equipment and comprising a cab, the display system comprising:
- a position detector configured to detect three-dimensional position information of the body comprising a current position, an orientation and an inclination angle of the body;
- a storage device configured to store target landform information of a work ground and locus information of the working equipment:
- a working equipment position detector configured to detect position information of the working equipment relative to the body;
- a real image display unit configured to display work-support information as a real image;
- a combiner configured to reflect the real image displayed on the real image display unit into the cab so that the work-support information is displayed as a virtual image superimposed on a view in front of the cab; and
- a display controller configured to control the real image display unit, wherein the display controller controls the real image display unit to display construction ground information indicating a landform in progress in accordance with geometry and position of the work ground, and the construction ground information is generated based on the three-dimensional position information of the body, the target landform information, and work progress information based on the locus information of the working equipment.

13. The display system for the construction machine according to claim 12, wherein the work-support information comprises operation information for guidance of an operation of the working equipment and distance information between the working equipment and the work ground.

* * * * *